United States Patent
McNulty, Jr.

(10) Patent No.: US 6,913,645 B2
(45) Date of Patent: Jul. 5, 2005

(54) CEMENTITIOUS MATERIAL

(76) Inventor: William J. McNulty, Jr., P.O. Box 672, Provo (TC)

(*) Notice: Subject to any disclaimer, the term of this patent is extended or adjusted under 35 U.S.C. 154(b) by 0 days.

(21) Appl. No.: 10/199,079

(22) Filed: Jul. 22, 2002

(65) Prior Publication Data

US 2003/0084826 A1 May 8, 2003

Related U.S. Application Data

(60) Provisional application No. 60/306,849, filed on Jul. 23, 2001.

(51) Int. Cl.$^7$ .......................... C04B 7/345; C04B 12/00; C04B 22/10
(52) U.S. Cl. ........................ 106/817; 106/638; 106/801; 106/811; 106/812; 106/814; 264/333; 423/421
(58) Field of Search ................................. 106/817, 638, 106/801, 811, 812, 814; 264/333; 423/421

(56) References Cited

U.S. PATENT DOCUMENTS 3,642,509 A * 2/1972 Fujimasu ................. 106/287.1
4,764,487 A * 8/1988 Lewis ......................... 501/70
6,264,740 B1 * 7/2001 McNulty, Jr. ............... 106/817

OTHER PUBLICATIONS

Chemical Abstract No. 96:10643, abstract of an article by Kozhukharov et al entitled "Production possibilities for stone–ceramic articles on a basalt base from the Vonyashta Voda deposit" Stroitelni Materiali i Silikatna Prmishlenost (1981) 22(6) 24–26.*

Chemical Abstract No. 105:11064, abstract of Japanese Patent Specification No. 61–048465 (Mar. 1986).*

* cited by examiner

*Primary Examiner*—Anthony J. Green

(57) ABSTRACT

A combination of compositions, products and methods of producing a new type of cement. The cementitious material is created by adding sodium carbonate (also known as soda ash, trona, natron, sodium carbonate decahydrate, sodium carbonate anhydrous, etc.) and one or more rocks or minerals selected from the following—granite, basalt, sandstone or schist. A new method and product are claimed by combining sodium carbonate and one or more rocks or minerals selected from the following—granite, basalt, sandstone or schist and water. The combination of sodium carbonate and one or more rocks or minerals selected from the granite, basalt, sandstone or schist group can be either layered or mixed in a dry or wet state. An exothermic reaction starts after the addition of water to the cementitious material. The composition of the cementitious material can vary between 10% sodium carbonate and 90% of one or more rocks or minerals selected from the granite, basalt, sandstone or schist group to 90% sodium carbonate and 10% of one or more rocks or minerals selected from the granite, basalt, sandstone or schist group. Organic or inorganic additives may be added to the mixture to enhance the composition and/or the final hardened product. The cementitious material or products can be used in a variety of applications not inclusive of forming bricks, interior architecture, table or counter tops, ornaments, repairing damaged cement products, casting, bioabsorbable devices, extruded products, sprayed products, filler, grout, mortar, gunnite, moulded products, composites, cast stonework, agglomerated stone, concrete, hardened products, electronics, packaging and other applications not mentioned above.

28 Claims, No Drawings

CEMENTITIOUS MATERIAL

CROSS-REFERENCE TO RELATED APPLICATIONS

This application claims the benefit of U.S. Provisional Ser. No. 60/306,849, filed Jul. 23, 2001.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

This invention relates to a new form of cementitious material which finds utility as a binder for aggregate. The invention also relates to a method of forming the cementitious material by mixing an inorganic material with water, creating an exothermic reaction by which the material hardens. In some instances, aggregate is added prior to, subsequent to, or simultaneous with the addition of water to create a concrete-like material.

2. Description of the Related Art

Hydraulic cements are known, the most widely encountered being Portland Cement, in which an inorganic material is heat treated at high temperatures, generally in a kiln, to activate the cement. When subsequently mixed with water, this cement hardens. When aggregate is added to the cement, it is generally known as concrete.

The invention relates to a new type of cementitious material formed of inorganic substances that do not require the high temperature heat treatment associated with Portland Cement.

Ancient Egyptians described using block or mud brick to build many structures, such as scenes of block forming in the Rekhmire tomb at Sheikh abd el-Qurna area of Egypt. Other formulas for making structures or casting are detailed on the Famine Stele located on the island of Sehel, Egypt.

BRIEF SUMMARY OF THE INVENTION

It is thus an object of the invention to provide a new type of inorganic cementitious material that will harden upon addition of water.

It is a further object of the invention to provide methods of using this new cementitious material as a binder for aggregate, to make bricks, blocks, cast stonework, cultured stone, agglomerated stone, retaining walls, pipe, grout, mortar, gunnite, stucco and similar or other products.

These and other objects of the invention will be more fully understood in connection with the detailed description of the embodiments of the invention.

BRIEF DESCRIPTIONS OF THE SEVERAL VIEWS OF THE DRAWING

Not Applicable

DETAILED DESCRIPTIONS OF THE INVENTION

In one embodiment, a cementitious material is formed by mixing a source of sodium carbonate with one or more rocks or minerals selected from the group consisting of granite, basalt, sandstone or schist, adding water and inducing an exothermic reaction to harden the cementitious material. The amounts of components can vary between 10 and 90 wt % sodium carbonate to 90 and 10 wt % of one or more rocks and minerals selected from the group consisting of granite, basalt, sandstone or schist as active ingredients.

The sodium carbonate can be in the form of sodium carbonate or as soda ash, sodium carbonate decahydrate, sodium carbonate anhydrous, natron, trona, etc.

As sources of one or more rocks and minerals selected from the group consisting of granite, basalt, sandstone or schist can be in the form of basalt, olivine basalt, basaltic lava, scoria, gabbroic magma, diabase, dolerite, melaphyre, anamesite, tholeite, porphyritic basalt, vesicular basalt, amygdaloidal basalt, nepheline basalt, sandstone, ripple-marked sandstone, bituminous sandstone, graywacke, arkose sandstone, calcerous sandstone, argillaceous sandstone, ferruginous sandstone, siliceous sandstone, micaceous sandstone, sedimentary quartzite, orthoquartzite, brownstone, greensand, red sandstone, glauconitic sandstone, millet-seed sandstone, limonitic sandstone, granite, orbicular granite, granodiorite, pink granite, white granite, porphyritic granite, graphic granite, hornblende granite, alkali granite, biotite granite, tormaline granite, flaser granite, two-mica granite, augite-homblende granite, rapakivi granite, tonalite granite, trondhjemite, quartz diorite, muscovite-biotite granite, muscovite granite, perthitic granite, granitoids, schist, augen schist, chlorite schist, albite schist, garnet schist, kyanite schist, staurolite schist, sillimanite schist, quartz-muscovite schist, chlorite-epidote schist, graphitic schist, folded schist, muscovite schist, biotite schist, phyllite schist, mica schist, sericite phyllite schist, greenschist, talc schist, prasinite, actinolite schist, glaucophane schist, hornblende schist.

When water is added to the mixture of inorganic materials hardening generally starts quickly. One or more of the cementitious materials may be in a wet state prior to mixing.

The fineness and grain size of the sodium carbonate and one or more rocks or minerals selected from the group consisting of granite, basalt, sandstone or schist components not only affects the overall appearance of the final product, but also its strength.

The sodium carbonate and one or more rocks or minerals selected from the group consisting of granite, basalt, sandstone or schist used in the invention can vary in particle size from that of powder, common sand, to dust, chips, clumps, or larger chunks of material. The particle size will normally be selected for the effect to be achieved in the finished product, and mixtures of particle sizes can be used in combination.

A colouring agent or dye may be introduced at the time of mixing the ingredients of the cementitious material of the invention that will affect the final colour of the resulting product, thereby allowing the ability to individually tailor the final appearance of the cementitious products.

As noted above, the resulting cementitious material can be employed as a filler, grout, mortar, gunnite, masonry, bricks or blocks, decorative effect, architectural or cast stonework, ornamental or cultured stone or granite, retaining walls, wall claddings, panelling, counter panels, roof and floor tiles, payers, precast stone, cobblestones, pipe, reinforced, including prestressed, concrete mixtures and products, agglomerated stone products and mixtures, extruded and moulded products and composites. It can be used as insulated sheathing, thermal insulation, pecking material and in housewares and appliances. It may be used as a component of boats, sailing crafts, temporary casts, table or countertops, bioabsorbable devices, electronic components, packaging, etc. alone or with other materials. It also finds utility as temporary fillings, temporary roads, temporary facilities, temporary shoring, temporary barriers, temporary support, temporary scaffolding, temporary walls, temporary docks, etc.

Aggregates which call be included within the cement include bedrock, traprock, quartz and quartzites, chryscolla, malachite, biotite and feldspar, etc.

It may be formed of a mixed homogeneous material or may take the form of a layered mix.

It is to be understood that variations and improvements may be made to the invention without departing from the spirit and scope of the appended claims.

I claim:

1. A cementitious product formed by reacting an uncalcined cementitious composition consisting of a source of sodium carbonate and one or more rocks or minerals selected from the group consisting of granite, basalt, sandstone and schist, wherein the sodium carbonate content is from 10% to 90% by weight and the one or more rocks or minerals selected from the group consisting of granite, basalt, sandstone and schist content is from 90% to 10% by weight and water is present in an amount sufficient to harden the cementitious product.

2. The cementitious product of claim 1, wherein an exothermic reaction is created between said water and said cementitious composition in the presence or absence of a hardener.

3. The cementitious product of claim 1, wherein the sodium carbonate is present in the form of a material selected from the group consisting of powder, dust, sand, clumps and combinations thereof.

4. The cementitious product of claim 1, wherein the source of one or more rocks or minerals selected from the group consisting of granite, basalt, sandstone and schist is present in the form of a material selected from the group consisting of powder, dust, sand, clumps and combinations thereof.

5. The cementitious product according to claim 1 in hardened form.

6. The cementitious product of claim 1, wherein said sodium carbonate and said one or more rocks or minerals selected from the group consisting of granite, basalt, sandstone and schist appear as layers in said product.

7. A solid product comprising at least one aggregate selected from the group consisting of bedrock, traprock, quartz, quartzite, marble, limestone, calcite, dolomite, chrysocolla, malachite, biotite and feldspar bonded with the cementitious product of claim 1.

8. The cementitious product according to claim 1 wherein one or more of the cementitious components selected from the sodium carbonate source, granite, basalt, sandstone or schist is in a wet state prior to mixing.

9. A method of forming a cementitious product comprising:

providing a mixture of a source of 10% to 90% by weight sodium carbonate and 90% to 10% by weight one or more rocks or minerals selected from the group consisting of granite, basalt, sandstone and schist in uncalcined form, mixing with water in an amount sufficient to harden the cementitious product in the presence or absence of aggregate;

inducing an exothermic reaction in the resulting mixture, and recovering a hardened product.

10. The method of claim 9, further including adding a colouring agents or dyes.

11. The method of claim 9, further including shaping the mixture prior to hardening thereof.

12. The method of claim 9, further including the presence or absence of a hardener.

13. The method of claim 9, further including the presence or absence of a waterproofing agent.

14. The method of claim 9, wherein the method produces a product which is selected from the group consisting of filler, grout, mortar, gunnite, stucco, masonry, decorative or architectural stonework, bricks, blocks, roof or floor tiles, cobblestones and pavers.

15. The method of claim 9, wherein the method produces a product which is selected from the group consisting of cultured stone, agglomerated stone, cast stone, panelling, retaining walls, wall claddings, counter panels, flooring, masonry, pipe, reinforced concrete, bricks, blocks, and pre-stressed concrete.

16. The method of claim 9, further including adding a natural and/or synthetic resin.

17. The method of claim 9, further including adding at least one inorganic and/or organic additives.

18. The method of claim 9, further including the step of shaping the cementitious product by at least one shaping step selected from the group consisting of moulding, spraying and casting.

19. The method of claim 9, further comprising adding an air-entraining admixture.

20. The method of claim 9 wherein the method produces a product that is in a layered form.

21. A cementitious composition comprising:

a mixture of a source of 10% to 90% by weight sodium carbonate and 90% to 10% by weight of one or more rocks or minerals selected from the group consisting of granite, basalt, sandstone and schist in uncalcined form, mixed with the presence or absence of aggregate.

22. A cementitious composition of claim 21, further including a colouring agents or dyes.

23. A cementitious composition of claim 21, further including the presence or absence of a hardener.

24. A cementitious composition of claim 21, further including at least one synthetic or natural resin additive or a combination of synthetic or natural resin additives.

25. A cementitious composition of claim 21, further including at least one organic or inorganic additive or a combination of inorganic and organic additives.

26. A cementitious composition of claim 21, further including an air-entraining admixture.

27. A cementitious composition of claim 21, further including a waterproofing agent.

28. A cementitious composition of claim 21, wherein one or more of the components selected from the sodium carbonate source, granite, basalt, sandstone or schist is in a wet state.

* * * * *

UNITED STATES PATENT AND TRADEMARK OFFICE
CERTIFICATE OF CORRECTION

PATENT NO. : 6,913,645 B2
APPLICATION NO. : 10/199079
DATED : July 5, 2005
INVENTOR(S) : William J. McNulty, Jr.

Page 1 of 1

It is certified that error appears in the above-identified patent and that said Letters Patent is hereby corrected as shown below:

Detailed Descriptions Column 2 Line 8 The sodium carbonate should be The source of sodium carbonate Detailed Descriptions Column 2 Line 63 floor tiles, payers should be floor tiles, pavers Detailed Descriptions Column 2 Line 67 pecking material should be packing material Detailed Descriptions Column 3 Line 9 Aggregates which call should be Aggregates which can Detailed Descriptions Column 3 Line 11 and feldspar should be and feldspar and combinations thereof Claim 9 Column 3 Line 61 by weight one or more should be by weight of one or more Claim 21 Column 4 Line 39 by weight sodium should be by weight of sodium Signed and Sealed this Fifteenth Day of September, 2009

David J. Kappos
*Director of the United States Patent and Trademark Office*